United States Patent [19]
Neely

[11] Patent Number: 5,471,824
[45] Date of Patent: Dec. 5, 1995

[54] MOTORIZED VEGETATION TRIMMER WITH MOVABLE PLATFORM

[76] Inventor: George J. Neely, 8334 Gum Rd., Murfreesboro, Tenn. 37130

[21] Appl. No.: 353,714

[22] Filed: Dec. 12, 1994

[51] Int. Cl.⁶ ............................ A03D 34/66; A03D 34/86
[52] U.S. Cl. ................. 56/10.4; 56/12.7; 56/DIG. 10
[58] Field of Search ..................... 56/10.4, 12.7, 56/14.9, 15.9, DIG. 10

[56] References Cited

U.S. PATENT DOCUMENTS

| | | | |
|---|---|---|---|
| 2,960,811 | 11/1960 | Roesel | 56/10.4 |
| 3,526,083 | 9/1970 | Barry et al. | 56/10.4 X |
| 5,065,566 | 11/1991 | Gates | 56/12.7 |
| 5,167,108 | 12/1992 | Bird | 56/12.7 X |
| 5,287,683 | 2/1994 | Smith | 56/12.7 |

*Primary Examiner*—David J. Bagnell
*Attorney, Agent, or Firm*—Rick R. Wascher; Wascher & Thomas

[57] ABSTRACT

A trimming apparatus comprising a platform, a plurality of wheels and a plurality of cutters. The platform has a kickback capability and is biased into an operable position, but capable of kicking back when the apparatus contacts rigid obstacles during the trimming operation. The cutting elements include a plurality of flexible blades having a cutting radius larger than the guide disks which are provided to contact obstacle and help the invention be steered around such obstacles. Optional bumpers are provided to further enable the device to "ride over" obstacles and uneven ground terrain. An independent power source such as an electrical or combustible engine having a drive shaft connected to a drive pulley which in turn is interconnected with the cutting elements by a cutter pulley and idler pulley arrangement so as to maintain a desired tension on the drive belt during operation of the device. The cutting blades are pivotally mounted to the cutting pulleys so that they may free float and recoil in response to contacting rigid obstacles.

4 Claims, 5 Drawing Sheets

5,471,824

MOTORIZED VEGETATION TRIMMER WITH MOVABLE PLATFORM

BACKGROUND OF THE INVENTION

1. Field of the Invention

The present invention relates generally to devices for trimming or cutting vegetation, but more particularly to such devices capable of trimming around fence posts, trees, and other obstacles and operating in conjunction with a motorized vehicle such as a lawn tractor.

2. Description of the Related Art

The mowing of fields and other large tracts of land, including many lawns, is often carried out by a motorized tractor with a mowing deck. Although this type of equipment provides a relatively wide mowing path and is thus capable of covering large areas, it is unable to trim closely around trees and other obstacles such as fence posts and rails, bushes, overhanging structure and other protuberances above the ground to be mowed.

Hand-held flexible line trimmers and other types of trimming manual and automatic devices have been developed to trim or cut vegetation around obstacles. Such devices can significantly increase the time and labor required to complete the job, especially in heavily treed areas or other areas having a large number of obstacles that require close trimming. The art to which the invention relates includes the following U.S. Patents:

U.S. Pat. No. 5,065,566 granted to Gates for a trimmer attachment for mowing decks and directed to a flexible line trimmer attachment for a tractor driven mower deck. A pivotal boom projects laterally from the mower deck and carries one or more trimming heads which rotate flexible lines using motive power supplied by the tractor.

U.S. Pat. No. 5,035,107 granted to Scarborough is directed to a lawn mower with trimming attachments. The Scarborough device includes an auxiliary trimming blade mounted in a housing attached to a swingarm assembly mounted on the primary mower housing.

U.S. Pat. No. 4,802,327 granted to Roberts for a mower attachment includes a cutting head assembly mounted on an extendable boom supported by a tractor. The cutting head assembly can be moved in three dimensions without changing the position of the tractor.

U.S. Pat. No. 3,907,039 granted to Remley, et al, is directed to a turf edging apparatus for tractors and the like. The Remley device includes a multi-functional turf edging apparatus secured to self-propelled tractors and including a principal frame releasably attachable to the underside of a standard tractor. An outrigger arm pivotally mounted on the frame includes a rotatable disc wherein such disc provides the edging operation.

The following U.S. Patents further comprise the art to which the invention relates.

| Inventor | Pat. No. |
| --- | --- |
| Gay | 5,251,428 |
| Lee, et al | 5,224,552 |
| Grube | 5,081,829 |
| Morris | 5,062,257 |
| Gordy | 4,870,810 |
| Wessel, et al | 4,718,221 |
| Owens | 4,642,976 |
| Green | 4,318,267 |

-continued

| Inventor | Pat. No. |
| --- | --- |
| Fulkerson, et al | 4,306,406 |
| Strate | 3,812,917 |
| Thompson, Jr. | 3,715,872 |

Until now, a self-contained trimming apparatus capable of being attached to a tractor or mower and having a plurality of cutting discs with flexible blades, bumpers, a kickback mechanism and height adjustment mechanism in the manner disclosed and claimed herein has not been invented.

SUMMARY OF THE INVENTION

The present invention is directed to a trimming apparatus having a platform and a plurality of cutters. The invention may be constructed as a left or right hand apparatus which will be come apparent after consideration of the description set forth below. The invention is preferably designed to operate in the same path of travel and field of view of a vehicle such as a lawn tractor.

The platform of the invention is supported above the ground by a plurality of wheels which can be adjusted to regulate the height of the cut and thus the height of the vegetation being trimmed. The invention also includes an independent power source having a drive shaft capable of driving a drive pulley means to operate the cutters.

The invention includes a plurality of cutters each having a plurality of flexible blades which are pivotally mounted to each cutter. The platform has a kickback mechanism to enable the platform and cutters attached thereto to recoil in response to contact with an immovable object or obstacle. The recoil mechanism includes a push tongue pivotally mounted to the platform, yet restricted to a finite path of travel and biased in one direction.

A roller mechanism prevents the platform from being forced out of plane or alignment with the surface on which the wheels roll so as to enable a more uniform cutting level. A series of idler pulleys are provided to maintain tension to the drive belt.

A plurality of bumpers are attached to the cutter mechanisms to prevent hangups around vegetation and enable the bumpers to roll around the surface contour of an obstacle thereby enabling the cutters to cut the vegetation growing up around the obstacle without missing vegetation to be cut.

The present invention can be summarized in a variety of ways, one of which is the following: An apparatus for trimming vegetation, comprising a platform moveable from a first position to a second position, and having a top surface, a bottom surface, and an edge; a power source attached to the platform and having a drive shaft extending from the top surface to the bottom surface of the platform; cutter means for trimming vegetation; the cutter means further includes at least one rotatable cutter pulley and a plurality of flexible blades pivotally mounted to the cutter pulley; a drive belt positioned in operative engagement with the drive shaft and the at least one cutter pulley to rotate the cutter pulley in response to an applied torque applied to the drive belt by the drive shalt; at least one idler pulley having a tendency to tighten the drive belt; an attachment arm; biasing means for biasing the platform to the first position; the attachment arm further includes roller means for maintaining the attachment arm in parallel alignment with the platform; the roller means includes a slot in formed in and extending through the platform, a roller shaft attached to the attachment arm and reciprocal within the slot, a rotatable roller, wherein the roller is provided to maintain operable contact with the bottom surface of the platform and provide stability to the platform when it moves between the first and second positions; and wheel means for positioning the platform in parallel alignment with a ground surface from which the vegetation to be trimmed grows and enabling the apparatus to roll over the ground surface.

The apparatus may also further include at least one bumper enabling the platform to ride over uneven ground surfaces. The plurality of flexible blades each have a proximal pivotal end and a free distal end extending beyond the edge of the platform, and a disk means may be mounted to the platform for shielding the distal end of the flexible blades.

It is an object of the present invention to provide a trimmer attachment which may be used with various makes and models of mowing decks and which neatly trims around obstacles without requiring precise maneuvering of the tractor.

It is an object of the present invention to provide a self-contained trimming apparatus having its own power source and capable of being mounted to and pushed by a tractor performing a mowing operation.

Another object of the present invention is to provide a vegetation trimming apparatus capable of recoiling when the device contacts an immovable object, therefore automatically trimming around the object in response to the contact.

It is a further object of the present invention to provide an apparatus for trimming vegetation having a plurality of cutters and height regulating means to trim vegetation at a controlled height.

Another object of the present invention is to provide a trimming apparatus that is substantially balanced to enable a plurality of cutters to trim a relatively wide path around obstacles, yet maintain a relatively level trimming surface and thus uniform vegetation height once it is trimmed.

DETAILED DESCRIPTION OF THE PREFERRED EMBODIMENT(S)

Figure 1:
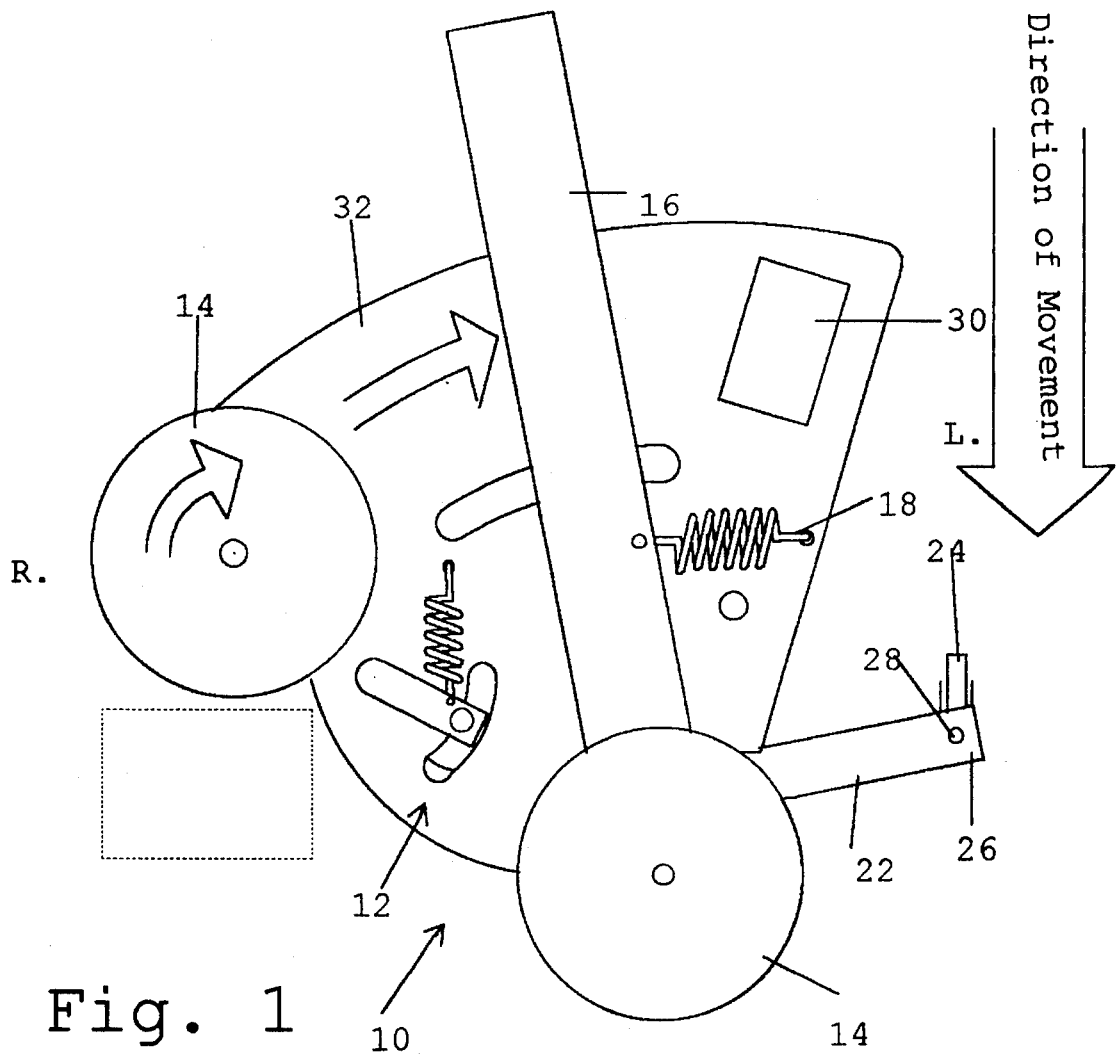
FIG. 1 is a top view of an embodiment of the present invention shown with the platform in its bias position.
Figure 2:
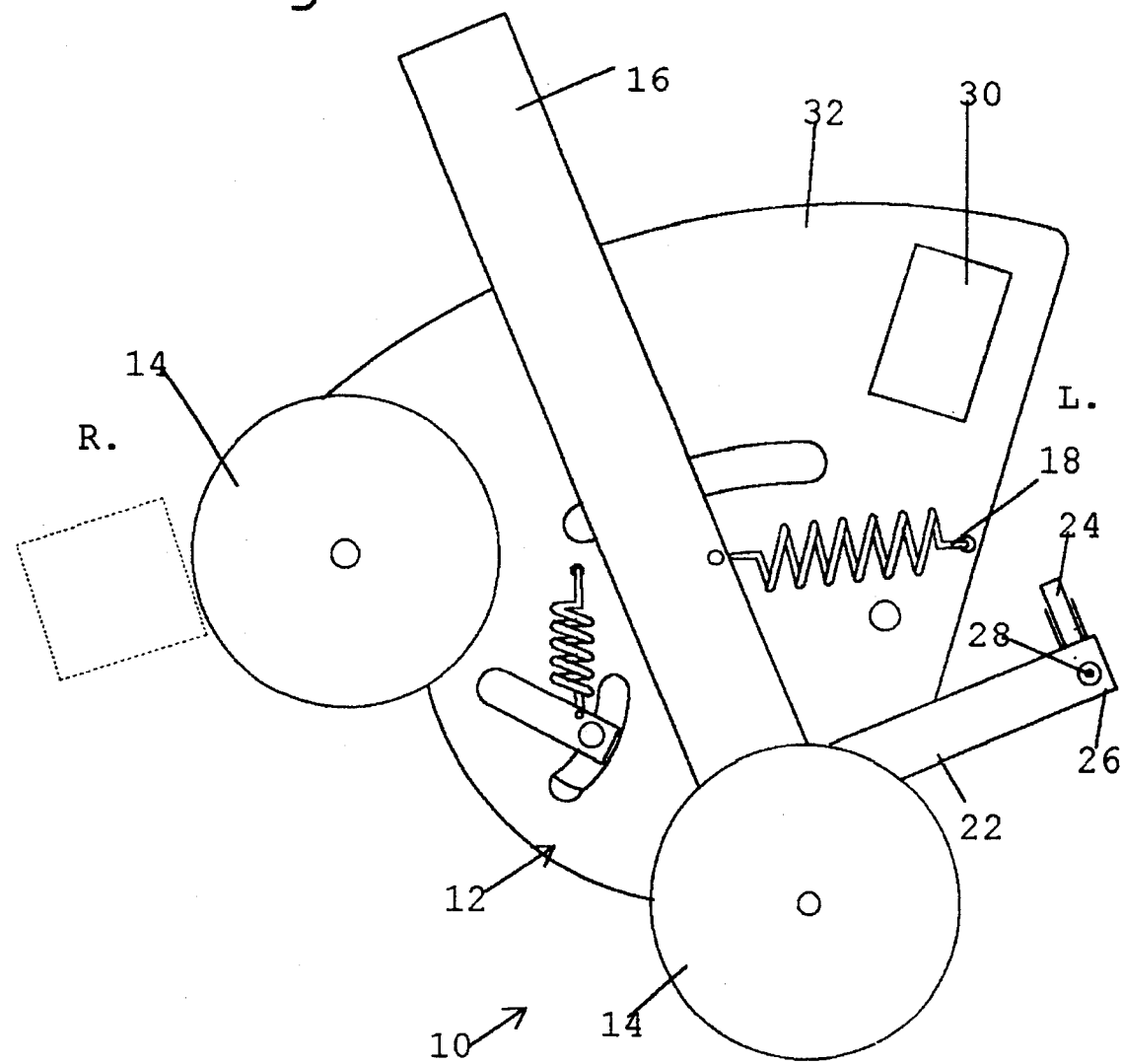
FIG. 2 is a top view of an embodiment of the present invention shown in FIG. 1 with the platform in its kickback position.

With reference to FIGS. 1 and 2, an embodiment of the present invention is designated generally by the reference numeral 10. The embodiment of the invention 10 has a right and a left side designated by the reference letters "R" and "L", respectively, in the orientation shown in FIGS. 1 and 2 (see also FIG. 3).

The embodiment of the invention 10 includes a platform 12, and a plurality of guide discs 14 which are designed to contact obstacles and enable the cutters of the device (described below) to kick back and trim around the obstacle it contacts. Attachment tongue 16 is biased into an operable position as shown in FIG. 1. Tongue 16 is pivotally mounted to the platform 12 to enable the platform 12 to "kick back" to the position shown in FIG. 2.

Biasing means 18 is shown as a spring in the figures, but may also include any other suitable means of biasing such as a pneumatic or hydraulic piston or cylinder arrangement, rubber or other elastomeric tension bands or any other suitable structure capable of biasing the tongue and platform into and out of the orientations shown in FIGS. 1 and 2.

Lateral support 22 has a wheel 24 attached to its distal end 26 by an axial fastener 28. As will be described below, the lateral support 22 and wheel combination 24 serve to assist other wheels attached to the underside of the platform (described with respect to FIG. 3) to enable the invention to maintain a relatively constant parallel arrangement with the ground surface and the vegetation being trimmed.

Figure 3:
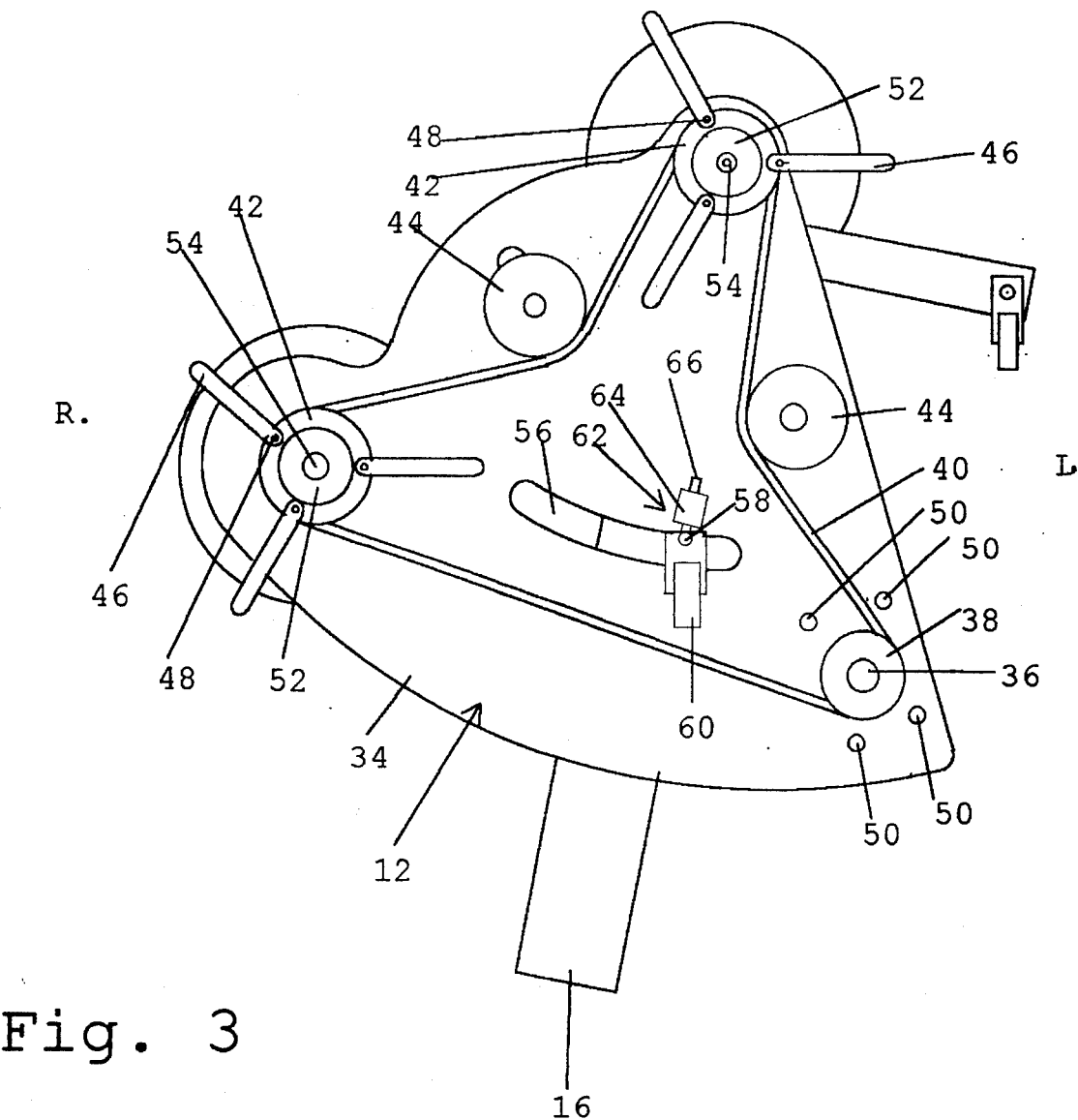
FIG. 3 is a bottom view of the present invention shown in FIG. 1.

Engine 30 is mounted to the platform 12. The engine can be electrical or a combustible gasoline or diesel engine so long as it has a drive shaft which extends through the upper surface 32 of the platform 12 and protrudes from the bottom surface 34 (FIG. 3). In addition, a clutch mechanism of any of a variety of conventional configurations can be used when a gasoline engine is provided with the invention.

With reference to FIG. 3, drive shaft 36 has a drive pulley 38 mounted along its axial length. Drive belt 40 engages the drive pulley 38 and cutter pulleys 42 and is held in tension therewith by idler pulleys 44. With respect to the cutter pulleys 42, a plurality of flexible cutting blades 46 are pivotally mounted to the pulley 44 at pivots 48. Accordingly, in operation, the motor or engine 30 (FIGS. 1 and 2) shown attached to the platform 12 by a plurality of conventional fasteners 50 (FIG. 3) provides the drive power sufficient to power the invention.

Bumpers 52 are mounted to the cutter shafts 54 to help maintain the invention in desired parallel alignment with the ground surface and vegetation to be trimmed. Kickback slot 56 receives the kickback post 58 (FIG. 3) to enable the platform 12 to reciprocate with respect to the tongue 16 in the manner illustrated in FIGS. 1 and 2. An adjustable leveling wheel 60 and roller mechanism 62 is attached to the kickback post 58. The leveling wheel 60 maintains the apparatus in the preferred orientation with the ground surface.

Roller mechanism 62 includes a roller 64 and shaft 66. The roller therefore is designed to contact the undersigned surface 34 of the platform 12 and rotate with respect to the shaft 66 to prevent binding and minimize counterforces preventing the platform from kicking back as shown in FIG. 2.

Figure 4:
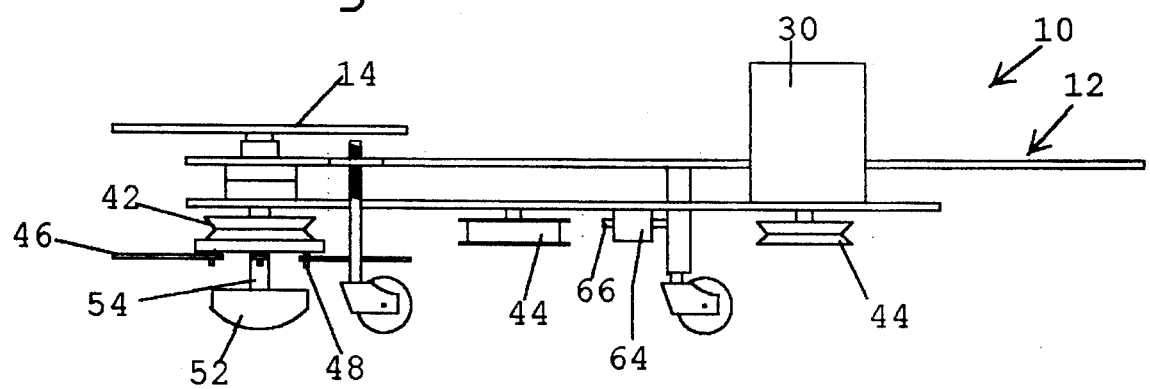
FIG. 4 is a left side view of the invention shown in FIGS. 1 and 2.
Figure 5:
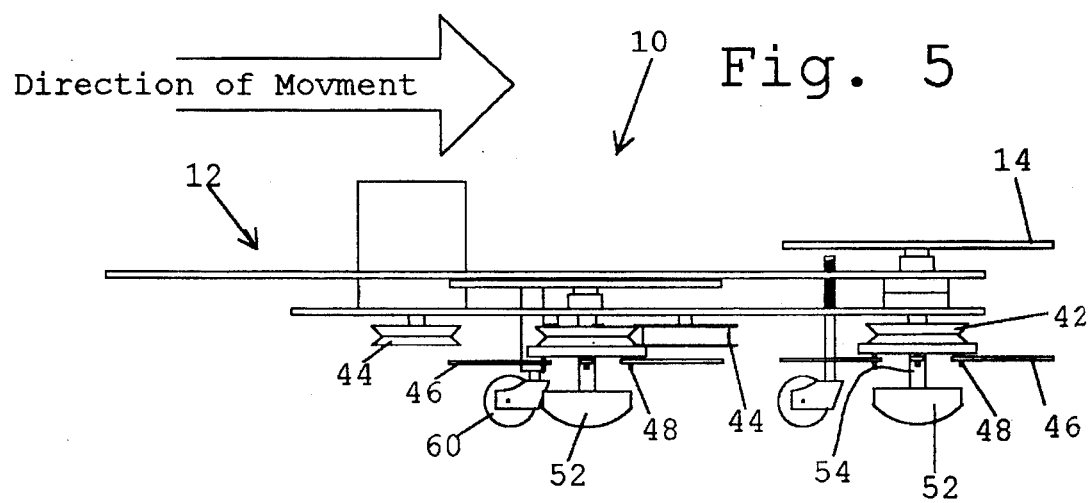
FIG. 5 is a right side view of the invention shown in FIGS. 1 and 2.

With reference to FIGS. 4 and 5, the orientation of the components described above are shown in relative alignment with one another in side views to provide a better understanding of the orientation of both components, the balanced combination of the invention, as well as the relative function of the wheels for leveling and bumpers for active contact with obstacles. In addition, FIGS. 4 and 5 illustrate that the flexible cutters or blades 46 extend beyond the guide discs 14 to enable the maximum cutting arc with respect to the configuration and geometry of the invention.

These and other embodiments of the present invention shall become apparent after consideration of the specification, drawings and claims. All such alternate embodiments and equivalents are contemplated as pan of the present invention, whose only limitation shall be the scope of the appended claims.

What is claimed is:

1. An apparatus for trimming vegetation, comprising:

a platform moveable from a first position to a second position, and having a top surface, a bottom surface, and an edge;

a power source attached to the platform and having a drive shaft extending from the top surface to the bottom surface of the platform;

cutter means for trimming vegetation;

the cutter means further includes at least one rotatable cutter pulley and a plurality of flexible blades pivotally mounted to the cutter pulley;

a drive belt positioned in operative engagement with the drive shaft and the at least one cutter pulley to rotate the cutter pulley in response to an applied torque applied to the drive belt by the drive shalt;

at least one idler pulley having a tendency to tighten the drive belt;

an attachment arm;

biasing means for biasing the platform to the first position;

the attachment arm further includes roller means for maintaining the attachment arm in parallel alignment with the platform;

the roller means includes a slot in formed in and extending through the platform, a roller shalt attached to the attachment arm and reciprocal within the slot, a rotatable roller, wherein the roller is provided to maintain operable contact with the bottom surface of the platform and provide stability to the platform when it moves between the first and second positions; and wheel means for positioning the platform in parallel alignment with a ground surface from which the vegetation to be trimmed grows and enabling the apparatus to roll over the ground surface.

2. The apparatus of claim 1, further including:

at least one bumper enabling the platform to ride over uneven ground surfaces.

3. The apparatus of claim 1, wherein:

the plurality of flexible blades each have a proximal pivotal end and a free distal end extending beyond the edge of the platform.

4. The apparatus of claim 3, further including:

disk means mounted to the platform for shielding the distal end of the flexible blades.

* * * * *